(12) United States Patent
Lai et al.

(10) Patent No.: US 11,139,874 B2
(45) Date of Patent: Oct. 5, 2021

(54) CONTROLLING METHOD AND COMMUNICATION DEVICE FOR ADJUSTING THE STATE OF A PLURALITY OF ANTENNAS

(71) Applicant: ASUSTeK COMPUTER INC., Taipei (TW)

(72) Inventors: Wei-Fan Lai, Taipei (TW); Ssu-Hao Su, Taipei (TW); Che-Yao Fan, Taipei (TW); Chi-Chung Liu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/780,961

(22) Filed: Feb. 4, 2020

(65) Prior Publication Data

US 2020/0259539 A1 Aug. 13, 2020

(30) Foreign Application Priority Data

Feb. 12, 2019 (TW) .................................. 108104661

(51) Int. Cl.
*H04B 7/06* (2006.01)
*H04B 17/318* (2015.01)
*H04B 17/10* (2015.01)
*H04B 7/08* (2006.01)

(52) U.S. Cl.
CPC ......... *H04B 7/0608* (2013.01); *H04B 7/0814* (2013.01); *H04B 17/104* (2015.01); *H04B 17/318* (2015.01)

(58) Field of Classification Search
CPC .. H04B 7/0608; H04B 17/318; H04B 17/104; H04B 7/0814; H04B 7/18545; H04B 7/0602; H04B 7/0802; H04B 7/0805; H04B 7/1855

See application file for complete search history.

(56) References Cited

U.S. PATENT DOCUMENTS

| 9,136,937 B1 * | 9/2015 | Cheng | H04B 7/0805 |
| 2009/0273533 A1 * | 11/2009 | Wolf | H01Q 21/064 343/770 |
| 2011/0151931 A1 * | 6/2011 | Kish | H04B 7/061 455/562.1 |

(Continued)

FOREIGN PATENT DOCUMENTS

| CN | 106169056 A | 11/2016 |
| TW | I627841 B | 6/2018 |

*Primary Examiner* — Mewale A Ambaye
(74) *Attorney, Agent, or Firm* — McClure, Qualey & Rodack, LLP

(57) ABSTRACT

A controlling method and a communication device are disclosed. The controlling method is applied to a communication device with a plurality of antennas. The controlling method includes the following operations: comparing a plurality of environmental parameters of the antennas in a comparison time interval to generate a determination result, wherein the determination result includes whether to switch the plurality of the antennas; adjusting the comparison time interval and a maintenance time interval according to the determination result; and transmitting or receiving wireless signals in the maintenance time interval. The controlling method and the communication device have the advantages of communication capability optimization and power saving.

10 Claims, 3 Drawing Sheets

(56) References Cited

U.S. PATENT DOCUMENTS

2012/0134441 A1* 5/2012 Yokomakura ........ H04B 7/0691
375/295
2018/0091178 A1* 3/2018 Kish .................... H04B 17/309
2019/0356364 A1* 11/2019 Maamari ............... H04L 5/0051

* cited by examiner

CONTROLLING METHOD AND COMMUNICATION DEVICE FOR ADJUSTING THE STATE OF A PLURALITY OF ANTENNAS

CROSS-REFERENCE TO RELATED APPLICATION

This application claims the priority benefit of Taiwan application serial No. 108104661, filed on Feb. 12, 2019. The entirety of the above-mentioned patent application is hereby incorporated by reference herein and made a part of the specification.

BACKGROUND OF THE INVENTION

Field of the Invention

The invention relates to a controlling method of a wireless network and a communication device.

Description of the Related Art

With the rapid development of technology, people's demand for the network is growing. Especially the network usage scenarios have been extended from indoors to outdoors. Wireless networking is needed in cafes, conference venues, and even high-speed rail carriages. Although the related technology is quite developed and multi-antennas are utilized to provide varies wireless network functions, however, when the environment is complex, the multi-antennas is switched frequently, and the resources of the network and system devices are wasted, which results in poor user experience.

BRIEF SUMMARY OF THE INVENTION

According to the first aspect of the disclosure, a controlling method applied to a communication device with a plurality of antennas is provided. The controlling method includes: comparing a plurality of environmental parameters of the antennas in a comparison time interval to generate a determination result, wherein the determination result includes whether to switch the plurality of the antennas; adjusting the comparison time interval and a maintenance time interval according to the determination result; and transmitting or receiving wireless signals in the maintenance time interval.

According to the second aspect of the disclosure, a communication device is provided. The communication device includes: a plurality of antenna; and a processor, couples with the plurality of antennas and configures to generate a determination result in the comparison time interval according to environmental parameters of the antennas, wherein the determination result includes whether to switch the plurality of the antennas, adjusting the comparison time interval and a maintenance time interval according to the determination result, and controlling one antenna of the plurality of the antennas to transmit or receive wireless signals in the maintenance time interval.

The controlling method and the communication device of the present disclosure automatically adjust the state of the antenna module by determining different environments and the field coverage capabilities of each antenna, and adjust the comparison time interval and the maintenance time interval, to achieve communication capacity optimization and save power.

These and other features, aspects and advantages of the present invention will become better understood with regard to the following description, appended claims, and accompanying drawings.

DETAILED DESCRIPTION OF THE EMBODIMENTS

Figure 1:
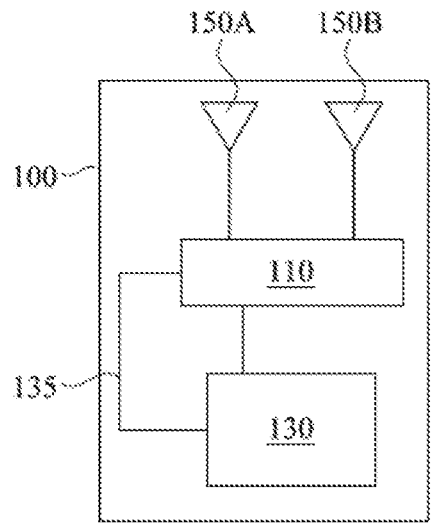
FIG. 1 is a schematic diagram of a communication device according to some embodiments of the present disclosure.

Embodiments of the present document will be described below in conjunction with the associated drawings. In the figures, the same reference numerals are used to refer to the same or similar elements or methods.

Please refer to FIG. 1. A communication device 100 includes a processor 130 and a plurality of the antennas 150A, 150B. The antennas 150A, 150B are coupled to the processor 130. In some embodiments, the communication device 100 is a smartphone or a tablet, but is not limited thereto. The number of the communication device 100, and the antennas 150A, 150B, etc. shown in FIG. 1 is for illustrative purposes only and is not limited to FIG. 1.

The operation of the communication device 100 will be described below in FIG. 2.

Figure 2:
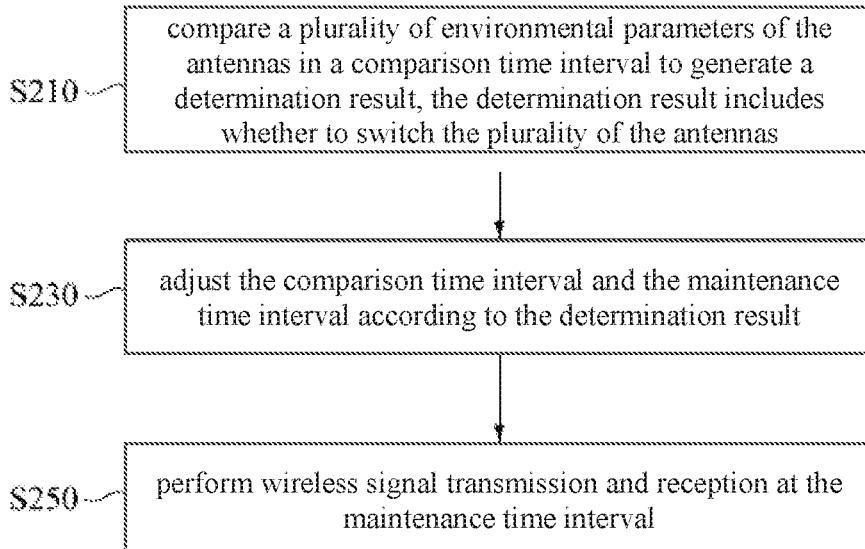
FIG. 2 is a flow chart of a control method according to some embodiments of the present disclosure.

Please refer to FIG. 2. A controlling method 200 includes steps S210 to S250. In step S210, comparing a plurality of environmental parameters of the antennas in a comparison time interval to generate a determination result. The determination result includes whether to switch the plurality of the antennas. In some embodiments, step S210 is performed by a processor 130 in FIG. 1. In detail, the communication device 100 operates in turn in the comparison time interval and the maintenance time interval. Within the comparison time interval, the processor 130 switches the antennas 150A, 150B to obtain the environmental parameters of the antennas 150A, 150B, respectively. The processor 130 generates the determination result including whether to switch the antenna according to the environmental parameters of the antennas 150A, 150B.

In some embodiments, the determination result in step S210 is generated according to a transmission throughput (Tput) of the environmental parameters. For example, in the comparison time interval, the processor 130 turns on the antenna 150A to obtain the transmission throughput of the antenna 150A, and then the processor 130 switches the antennas, that is to say, turns off the antenna 150A and turns on the antenna 150B to obtain the transmission throughput of the antenna 150B. The processor 130 compares the transmission throughput of the antenna 150A with the transmission throughput of the antenna 150B, and determines the antenna with larger transmission throughput to be used or operated.

As stated above, when it is determined that the antenna used in the next maintenance time interval is different from the antenna used in the present maintenance time interval, the processor 130 determines that the antenna needs to be switched. On the other hand, when it is determined that the antenna used in the next maintenance time interval is the same as the antenna used in the present maintenance time interval, the processor 130 determines that the antenna is no need to be switched.

In some embodiments, in step S210, the comparison is performed multiple times to determine which one in the antennas 150A, 150B is to be used in the next maintenance time interval. In one embodiment, assuming that the comparison time interval is 300 ms, the processor 130 captures the respective environmental parameters of the antennas 150A, 150B every 100 ms. Thus, the processor 130 obtains the environmental parameters of the antennas 150A, 150B three times, and compares the environmental parameters of the antenna 150A, 150B three times. In the three comparison results, if the environmental parameters of the antenna 150A are larger than the environmental parameters of the antenna 150B twice, the environmental parameters of the antenna 150B are larger than the environmental parameters of the antenna 150A once, the processor 130 determines the antenna 150A to be used in the next maintenance time interval.

In step S230, adjusting the comparison time interval and the maintenance time interval according to the determination result. In some embodiments, step S230 is performed by the processor 130 in FIG. 1. When the determination result in step S210 is to switch the antennas, the processor 130 extends the comparison time interval and shortens the maintenance time interval in step S230. In one embodiment, for extending the comparison time interval, the comparison time interval is extended from 300 ms to 500 ms, and the processor 130 captures the respective environmental parameters of the antenna 150A, 150B every 100 ms. Thus, the processor 130 obtains the environmental parameters of the antenna 150A, 150B five times, and compares the environmental parameters of the antenna 150A, 150B to determine whether the antenna needs to be switched more accurately.

On the other hand, when the determination result in step S210 is not to switch the antennas, it indicates that the current environmental state of the communication device 100 is relatively stable, therefore, the processor 130 shortens the comparison time interval and extends the maintenance time interval in step S230.

In step S250, wireless signal transmission or wireless signal reception is performed at the maintenance time interval. In some embodiments, step S250 is performed by the antenna 150A or 150B in FIG. 1. When it is determined that the antenna 150A is to be used in step S210, the communication device 100 uses the antenna 150A to transmit to receive the wireless signal in the maintenance time interval in step S250.

As described above, in some embodiments, during the maintenance time interval of step S250, the processor 130 continuously collects the environmental parameters of the antenna 150A, and determines whether to abort the maintenance time interval according to the environmental parameter of the antenna 150A.

In some embodiments, in the maintenance time interval, the processor 130 determines whether to abort the maintenance time interval according to the transmission throughput (Tput) and the received signal strength indication (RSSI) in the environmental parameters. In some embodiments, when the transmission throughput is less than a transmission throughput threshold and the received signal strength indication is less than a received signal strength indication threshold, the processor 130 aborts the maintenance time interval and returns to the comparison time interval.

As described above, in some embodiments, the transmission throughput (Tput) and the received signal strength indication (RSSI) are considered simultaneously in the maintenance time interval to provide a better user experience. In an embodiment, the user's environment has not changed, but the user's networking behavior changes. In this case, the data collected by the processor 130 indicates that the transmission throughput is reduced but the received signal strength indication is unchanged. Under the circumstances, the transmission throughput is reduced due to the user's networking behavior changes, and does not need to abort the maintenance time interval. In other embodiment, the transmission throughput is unchanged but the received signal strength indication is reduced. In this case, the user's networking experience is not affected, so there is no need to abort the maintenance time interval.

However, when the transmission throughput is reduced to less than the transmission throughput threshold and the received signal strength indication is also reduced to less than the received signal strength indication threshold, the networking performance to users is affected. Therefore, in this case, the maintenance time interval is aborted and returns to the comparison time interval to determine whether the antennas need to be switched. Thus, the user obtains a better networking experience.

Besides, in step S250, at the end of the maintenance time interval, the communication device 100 returns to the comparison time interval to compare the environmental parameters of the antennas 150A, 150B again, to determine whether to switch the antenna.

Figure 3:
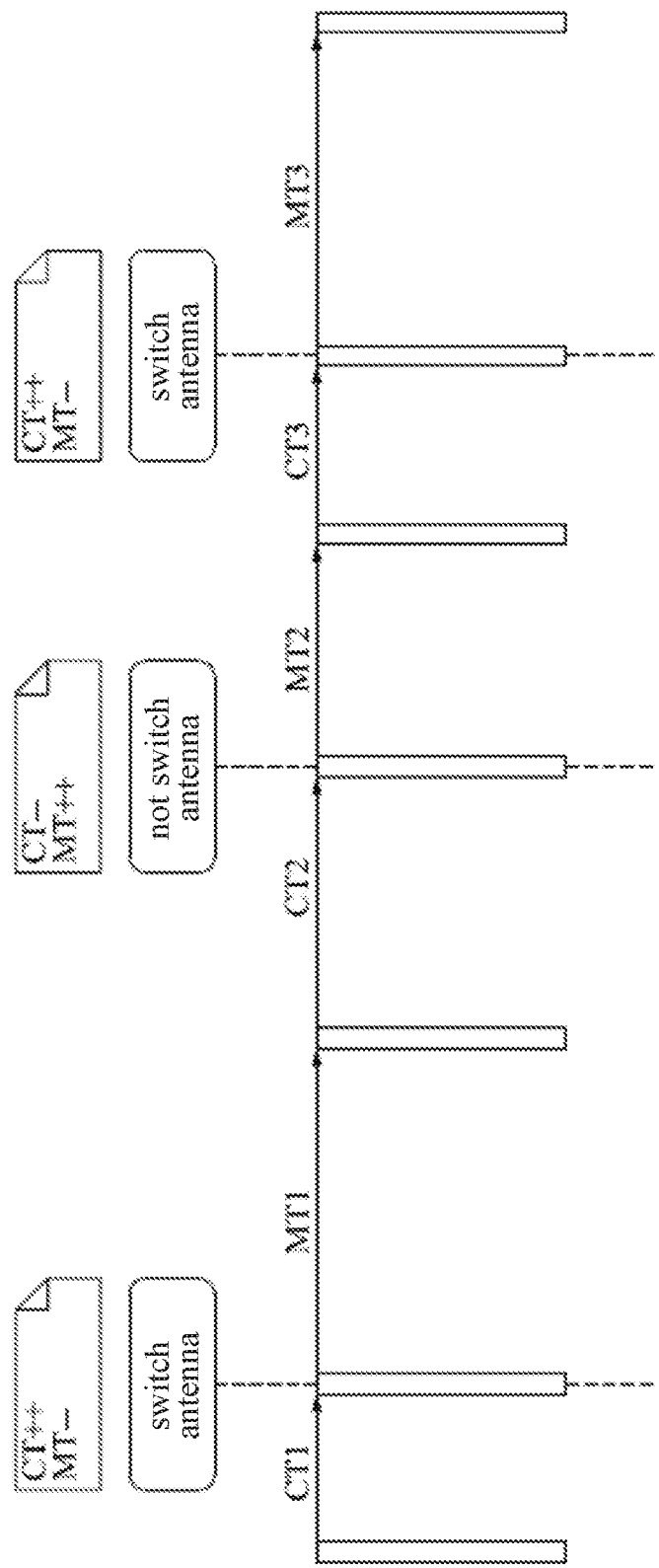
FIG. 3 is a schematic diagram showing the operation of the controlling method according to some embodiments of the present disclosure.

Please refer to FIG. 3. As shown in FIG. 3, at the end of the comparison time interval CT1, the processor 130 determines that the antennas need to be switched, and the processor 130 extends the comparison time interval CT and shortens the maintenance time interval MT. At the end of the comparison time interval CT2, the processor 130 determines that the antennas need not to be switched, the processor 130 shortens the comparison time interval CT and extends the maintenance time interval MT. At the end of the comparison time interval CT3, when the processor 130 determines that the antennas need to be switched, and the processor 130 extends the comparison time interval CT and shortens the maintenance time interval MT.

Figure 4:
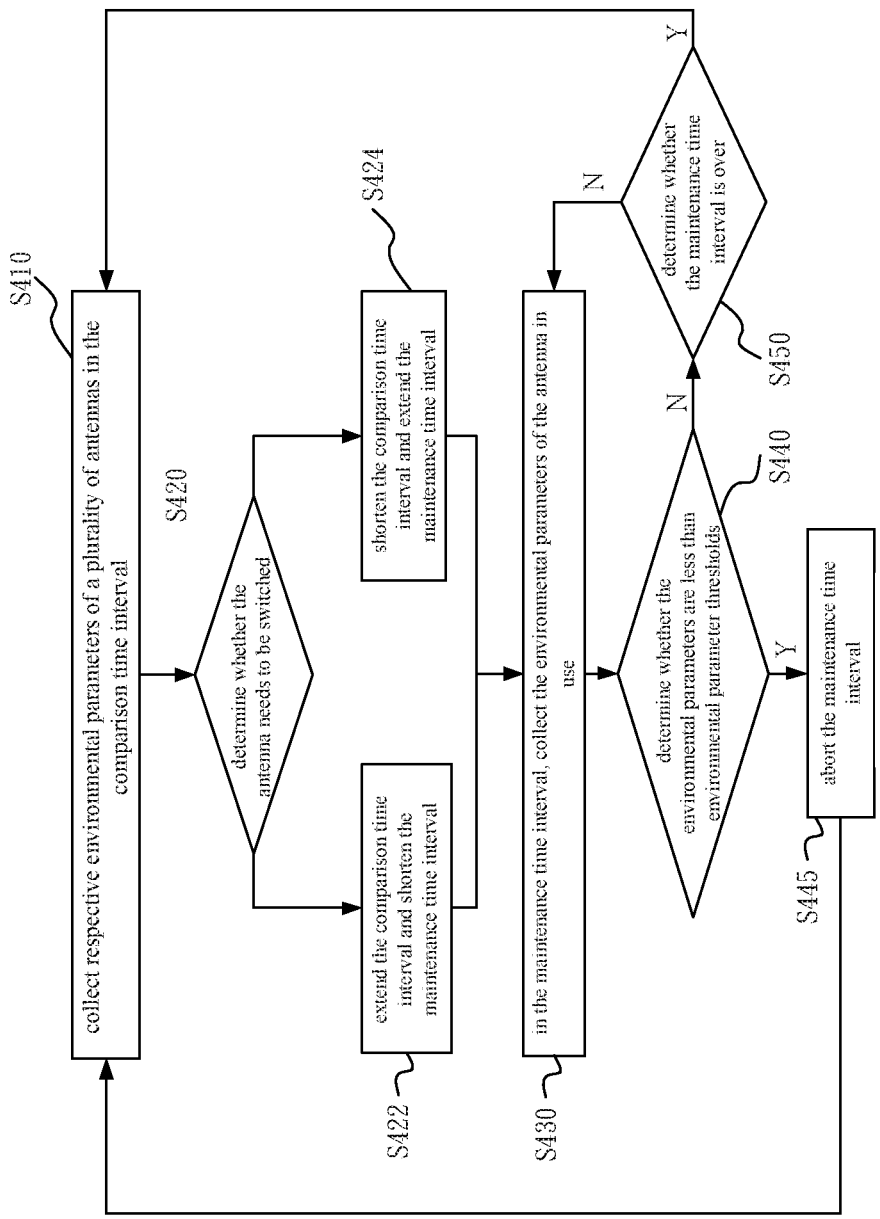
FIG. 4 is a flow chart of a control method according to some embodiments of the present disclosure.

Please refer to FIG. 4. The controlling method 400 includes steps S410 to S450.

In step S410, collect respective environmental parameters of a plurality of antennas in the comparison time interval. For example, the environmental parameters are obtained by the antennas 150A, 150B as shown in FIG. 1 and then transmitted to the processor 130.

In step S420, determine whether the antenna needs to be switched. In some embodiments, the processor 130, shown in FIG. 1, determine whether the antenna needs to be switched according to the respective environmental parameters of the antennas 150A, 150B of FIG. 1 in step S420. When the antenna needs to be switched, perform step S422. Otherwise, when the antenna does not need to be switched, perform step S424.

In step S422, extend the comparison time interval and shorten the maintenance time interval. In step S424, shorten the comparison time interval and extend the maintenance time interval. In some embodiments, steps S422, S424 is performed by the processor 130 as shown in FIG. 1.

In step S430, in the maintenance time interval, collect the environmental parameters of the antenna in use. In some embodiments, step S430 is performed by the processor 130 as shown in FIG. 1 via the antenna 150A or 150B.

In step S440, determine whether the environmental parameters are less than environmental parameter thresholds. In some embodiments, step S440 is performed by the processor 130 as shown in FIG. 1. When it is determined that the environmental parameters are less than the environmental parameter thresholds, step S445 is performed. On the other hand, when it is determined that the environmental parameters are not less than the environmental parameter thresholds, perform step S450. The environmental parameters include the transmission throughput and the received signal strength indication.

In an embodiment, in step S440, firstly determine whether the transmission throughput is less than the transmission throughput threshold of the environmental parameter thresholds. When the transmission throughput is less than the transmission throughput threshold, further determine whether the received signal strength indication is less than the received signal strength indication threshold of the environmental parameter thresholds. When the received signal strength indication is less than the received signal strength indication threshold, perform step S445. When the transmission throughput is not less than the transmission throughput threshold or the received signal strength indication is not less than the received signal strength indication threshold, perform step S450.

In step S445, abort the maintenance time interval. In some embodiments, step S445 is performed by the processor 130 as shown in FIG. 1. In detail, after the maintenance time interval is aborted, return to the comparison time interval to re-determine the antenna to use.

In step S450, determine whether the maintenance time interval is over. In some embodiments, step S450 is performed by the processor 130 as shown in FIG. 1. When it is determined that the maintenance time interval is not aborted, perform step S430 to continue collecting the environmental parameters of the antenna in use. On the other hand, when it is determined that the maintenance time interval is over, perform step S410 to return to the comparison time interval.

Please refer back to FIG. 1. As shown in FIG. 1, in some embodiments, the communication device 100 further includes a switch 110 for switching the antenna to transmit or receive wireless signals by the antenna 150A or 150B. In some embodiments, the communication device 100 further includes a control pin 135 coupled to the switch 110 and the processor 130 for receiving and transmitting voltage.

According to the embodiments above mentioned, a control method and the communication device provided in the disclosure, which automatically adjusts the state of the antenna module by determining different environments and respective field coverage capabilities of the antenna, and further adjust the comparison time interval and the maintenance time interval to achieve functions of communication capacity optimization and save power.

Certain terms are used throughout the description and claims to refer to particular elements. However, those skilled in the art should understand that the same components may be referred to by different terms. The specification and claims do not use the difference in terms as the way to distinguish between components, but the difference in functions between components as a basis for differentiation. The term "comprising" as used in the specification and claims is an open term and should be interpreted as "including but not limited to". In addition, "coupling" hereby includes any direct and indirect means of connection. Therefore, if the first element is described as being coupled to the second element, it represents that the first element is directly connected to the second element by electrically connection or by signal connection such as wireless transmission, optical transmission or the like, or indirectly electrically or signally connected to the second component through other components or connection means.

The dimensions and relative sizes of some of the elements shown may be exaggerated, or the shapes of some of the elements may be simplified so that the contents of the embodiments can be more clearly expressed. Therefore, unless otherwise indicated by the applicant, the shapes, dimensions, relative sizes and relative positions of the various elements in the drawings are merely illustrative and should not be used to limit the scope of the disclosure. In addition, the present disclosure may be embodied in many different forms, and the present disclosure should not be limited to the embodiments set forth in the present specification.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A controlling method, applied to a communication device including a plurality of antennas, the controlling method comprising:
   comparing a plurality of environmental parameters of the plurality of antennas in a comparison time interval to generate a determination result, wherein the determination result includes whether to switch the plurality of the plurality of antennas;
   adjusting the comparison time interval and a maintenance time interval according to the determination result; and
   transmitting or receiving wireless signals in the maintenance time interval.

2. The controlling method according to claim 1, the environmental parameters of the plurality of antennas include a transmission throughput, and the determination result is generated according to the transmission throughput.

3. The controlling method according to claim 1, the step of adjusting the comparison time interval and the maintenance time interval according to the determination result including:
   extending the comparison time interval and shortening the maintenance time interval when the determination result is to switch the plurality of antennas; and
   shortening the comparison time interval and extending the maintenance time interval when the determination result is not to switch the plurality of antennas.

4. The controlling method according to claim 1, further comprising:
   collecting the environmental parameters of a first antenna of the plurality of the antennas in the maintenance time interval, wherein the first antenna is an antenna in use; and
   determining whether to abort the maintenance time interval according to the environmental parameters of the first antenna.

5. The controlling method according to claim 4, the environmental parameters of the first antenna include the transmission throughput and a received signal strength indication.

6. The controlling method according to claim 5, further comprising:

aborting the maintenance time interval when the transmission throughput is less than a transmission throughput threshold and the received signal strength indication is less than a received signal strength indication threshold.

7. A communication device, comprising:
a plurality of antenna; and
a processor, coupled with the plurality of antennas and configured to generate a determination result in the comparison time interval according to an environmental parameters of the plurality of antennas, wherein the determination result includes whether to switch the plurality of the plurality of antennas, adjusting the comparison time interval and a maintenance time interval according to the determination result, and controlling one antenna of the plurality of the plurality of antennas to transmit or receive wireless signals in the maintenance time interval.

8. The communication device according to claim 7, the processor is further configured to extend the comparison time interval and shorten the maintenance time interval when the determination result is to switch the plurality of antennas; and the processor shortens the comparison time interval and extends the maintenance time interval when the determination result is not to switch the plurality of antennas.

9. The communication device according to claim 7, the processor is configured to determine whether to abort the maintenance time interval according to the environmental parameters of a first antenna of the plurality of the plurality of antennas during the maintenance time interval, wherein the first antenna is turned on during the maintenance time interval.

10. The communication device according to claim 9, the environmental parameters of the first antenna include the transmission throughput and a received signal strength indication, and the processor aborts the maintenance time interval when the transmission throughput is less than a transmission throughput threshold and the received signal strength indication is less than a received signal strength indication threshold.

\* \* \* \* \*